Patented Jan. 1, 1924.

1,479,107

UNITED STATES PATENT OFFICE.

JOHN L. OHMAN, DECEASED, LATE OF NIAGARA FALLS, NEW YORK; BY CHARLES A. WHITE, ADMINISTRATOR, OF BUFFALO, NEW YORK, ASSIGNOR TO BUFFALO REFRACTORY CORPORATION, OF BUFFALO, NEW YORK, A CORPORATION OF DELAWARE.

REFRACTORY COMPOSITION.

No Drawing. Original application filed November 1, 1917, Serial No. 199,792. Patent No. 1,356,939. Divided and this application filed October 9, 1920. Serial No. 415,876.

*To all whom it may concern:*

Be it known that JOHN L. OHMAN, deceased, late a subject of the King of Sweden, and a resident of Niagara Falls, county of Niagara, and State of New York, by Charles A. White, his administrator (residing at city of Buffalo, county of Erie, and State of New York), did invent a certain new and useful Refractory Composition, of which the following is a full, clear, and exact description.

This is a divisional application based on the original disclosure made in application Serial No. 199,792, filed November 1, 1917, now Patent. No. 1,356,939 for patent on refractory materials.

The general object of this invention has been to provide a refractory composition which shall be elastic and very durable, thus preventing cracking, disintegrating, corroding, and oxidizing.

Another object has been to provide a refractory composition which shall be easily and cheaply manufactured and one in which, in order to permanently bind the constituent materials together, it shall be unnecessary to raise the composition to the temperature of recrystallization.

Another object has been to provide a composition which shall resist chemical action and one which shall greatly increase the life of the articles which are made therefrom.

In the specification, this composition is described as applied to the construction of a crucible; it being obvious that it can be used for making any heat resisting articles; such as, fire bricks, retorts, muffles, refractories, furnace cores, tubes, combustion boats, furnace linings, and heat resisting cements.

It is well known to those skilled in the art, that crucibles in common use (known to the trade as graphite crucibles) have been formed either of plumbago or graphite, and preferably German clay, and a slight addition of silica in the form of sand (sometimes fire sand). These graphite crucibles oxidize and disintegrate quite rapidly both from the action of the furnace fires on the outside of the crucibles, and, on the inside, from the effects of the fluxes used in the metals contained therein. The repeated heating and cooling to which these crucibles are ordinarily subjected causes them to flake off in large sheets (termed scalping) and also to crumble. The life of a graphite crucible, therefore, is comparatively short.

This composition is made up preferably of the following elements in the proportions named:

Silicon carbide (SiC) substantially 34 parts.

Fused silicon oxide ($SiO_2$) substantially 34 parts.

Crystalline graphite substantially 25 parts.

Binder substantially 7 parts.

In the above formula, equal parts of silicon carbide and fused silicon oxide are set forth, it being understood, however, that these elements are the equivalent of each other and that the total, 68 parts, of the entire composition may be divided between these two elements in any desired manner. As is well known in the art, fire sand is not a chemically inert refractory electric furnace product, and, therefore, it is not considered to be the equivalent of the silicon carbide or fused silicon oxide.

As a binder for my composition, clay may be used, or, if desired, a carbonizing binder (such as tar, pitch or molasses) may be used as a binding agent. However, when using a carbonizing binder, a fusion mixture is preferably used for protecting the composition against oxidation and disintegration. A clay, having a low fusion point, may be used as such fusion agent. In place of using clay as a protector or flux, I may substitute a metallic or non-metallic salt (such as borax or feldspar), oxide (such as oxide of iron) or other suitable fusion mixture. It will be understood that a combination of different salts or different oxides, or a combination of both of these fusion agents may be used. It is necessary, however, when carbonizing binders are used, to increase the percentage of such binders.

In making a crucible, the ingredients are thoroughly mixed and placed upon a potter's wheel, where the crucible is spun in the usual manner, or, if desired, the mass may be pressed or molded into shape. After the crucible is formed by spinning, pressing, or molding, it is dried and then baked at a low temperature (approximately 1000° C). After baking the crucible is ready for use.

In the experiments made in connection with this invention, it has been found that a portion of the natural crystalline graphite is absolutely necessary in the construction of the larger refractory articles, if they are to be durable. Crystalline graphite is known for its very high fusion point; its good conductivity of heat; and its chemical resisting characteristics. This graphite, when molded or spun into crucibles, lies in thin laminæ or layers overlapping one another, thus giving a certain amount of flexibility to the whole body of the crucible, which enables it to withstand sudden changes in temperature without cracking.

As is well known, silicon carbide and fused silicon oxide, are products of the electric furnace; the former being a chemical compound of silicon and carbon, and the latter being a chemical compound of silicon and oxygen. Each of these materials has a very high fusion point; is very inert chemically, as is graphite; is a good conductor of heat; has an extremely low co-efficient of expansion; and shows practically no oxidation under extreme heat.

These materials, therefore, mixed with crystalline graphite, make a very suitable refractory article, which is a good conductor of heat, is elastic, tough, strong, and highly resistant to oxidation and the action of fluxes. The use of a metallic or non-metallic salt, oxide, or other fusion mixture, is to assist in the binding of the materials and to form a protecting coating around the graphite and the carbonizing binder, when such binder is used.

While certain proportions of the different ingredients have been set forth, it is obvious that they may be varied somewhat without departing from this invention, as, for instance, when making a very small crucible a large percentage of the refractory base may be used; but, when making large crucibles, the proportion of the graphite will be increased to give the finished product sufficient flexibility so that it will expand and contract without fracture.

While the term "crystalline" is used in this application as applied to graphite, it is to be understood that this term also includes what is known in the trade as "flake" graphite, which is the equivalent of crystalline graphite.

Having thus described this invention, what is claimed is:

1. A refractory composition for heat resisting articles, comprising silicon carbide and fused silicon oxide, and crystalline graphite.

2. A refractory composition for heat resisting articles, comprising silicon carbide and fused silicon oxide, crystalline graphite, and a binder.

3. A refractory composition for heat resisting articles, comprising silicon carbide and fused silicon oxide, crystalline graphite, and a salt.

4. A refractory composition for heat resisting articles, comprising silicon carbide and fused silicon oxide, crystalline graphite, and clay.

5. A refractory composition for heat resisting articles, comprising silicon carbide and fused silicon oxide, crystalline graphite, and a carbonizing binder.

6. A refractory composition for heat resisting articles, comprising silicon carbide and fused silicon oxide, crystalline graphite, a binder and a salt.

7. A refractory composition for heat resisting articles, comprising silicon carbide and fused silicon oxide, crystalline graphite, a carbonizing binder, and a salt.

8. A refractory composition for heat resisting articles, comprising silicon carbide and fused silicon oxide, crystalline graphite, a carbonizing binder, and clay.

9. A refractory composition for heat resisting articles, comprising substantially 68% of a mixture of silicon carbide and fused silicon oxide, substantially 25% of crystalline graphite, and substantially 7% of a binder.

10. A refractory composition for heat resisting articles, comprising substantially 68% of a mixture of silicon carbide and fused silicon oxide, substantially 25% of crystalline graphite, and substantially 7% of a carbonizing binder and a clay, the clay having a low fusion point and acting as a protector.

11. A refractory composition for heat resisting articles, comprising substantially 68% of a mixture of silicon carbide and fused silicon oxide, substantially 25% of crystalline graphite, and substantially 7% of a carbonizing binder and a salt.

12. A refractory composition for heat resisting articles, comprising substantially 34% of silicon carbide, substantially 34% of fused silicon oxide, substantially 25% of crystalline graphite, and substantially 7% of a binder.

13. A refractory composition for heat resisting articles, comprising substantially 34% of silicon carbide, substantially 34% of fused silicon oxide, substantially 25% of crystalline graphite, and substantially 7% of a carbonizing binder and clay, the clay having a low fusion point and acting as a protector.

In testimony whereof, I have hereunto signed my name.

CHARLES A. WHITE.
*Administrator of the estate of John L. Ohman, deceased.*